(12) United States Patent
Stanley et al.

(10) Patent No.: US 6,577,023 B1
(45) Date of Patent: Jun. 10, 2003

(54) OCCUPANT DETECTION SYSTEM

(75) Inventors: James G. Stanley, Novi, MI (US); Robert A. Stopper, Jr., Plymouth, MI (US); Judson G. McDonnell, Farmington Hills, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 0 days.

(21) Appl. No.: 09/474,470

(22) Filed: Dec. 29, 1999

Related U.S. Application Data

(60) Provisional application No. 60/114,269, filed on Dec. 30, 1998, provisional application No. 60/133,630, filed on May 11, 1999, provisional application No. 60/133,632, filed on May 11, 1999, and provisional application No. 60/143,761, filed on Jul. 13, 1999.

(51) Int. Cl.[7] .................................................. B60L 1/00
(52) U.S. Cl. ........................................ 307/10.1; 701/50
(58) Field of Search ............................. 307/10.1, 10.2; 701/45

(56) References Cited

U.S. PATENT DOCUMENTS

| | | | |
|---|---|---|---|
| 3,111,608 A | 11/1963 | Boenning et al. | 361/179 |
| 3,177,481 A | 4/1965 | Joy et al. | 246/167 R |
| 3,237,105 A | 2/1966 | Kalmus | 340/562 |
| 3,324,848 A | 6/1967 | Domeier et al. | 600/535 |
| 3,439,358 A | 4/1969 | Salmons | 340/552 |
| 3,740,567 A | 6/1973 | Atkins | 307/10 SB |
| 3,898,472 A | 8/1975 | Long | 307/10 SB |
| 3,943,376 A | 3/1976 | Long | 307/116 |
| 4,300,116 A | 11/1981 | Stahovec | 340/32 |
| 4,430,645 A | 2/1984 | Eskandry et al. | 340/572 |
| 4,625,329 A | 11/1986 | Ishikawa et al. | 382/1 |
| 4,795,013 A | 1/1989 | Yasuda et al. | 340/562 |
| 4,831,279 A | 5/1989 | Ingraham | 307/116 |
| 4,887,024 A | 12/1989 | Sugiyama et al. | 324/674 |
| 4,960,177 A | * 10/1990 | Holm-Kennedy et al. | 177/210 C |
| 4,980,519 A | 12/1990 | Mathews | 178/19 |
| 5,071,160 A | 12/1991 | White et al. | 280/735 |
| 5,074,583 A | 12/1991 | Fujita et al. | 280/735 |
| 5,118,134 A | 6/1992 | Mattes et al. | 280/735 |
| 5,161,820 A | 11/1992 | Vollmer | 280/730 |

(List continued on next page.)

OTHER PUBLICATIONS

H. Philipp, "The Charge Transfer Sensor", Sensors magazine, Nov., 1996 pp. 36–40 and 42.

Jinno K.; Ofuji, M.; Saito, T.; Sekido, S.; "Occupant Sensing Utilizing Perturbation of Electric Fields", SAE 971051, Reprinted from: Anthropomorphic Dummies and Crash Instrumentation Sensors (SP–1261), SAE International Congress & Exposition, Detroit, MI Feb. 24–27, 1997 pp. 117–129.

Fink, Donald G. and Beaty, H. W.; Standard Handbook for Electrical Engineers 12th ed., McGraw–Hill Book Co, 1987, pp. 3–57 through 3–65.

Smith, J.R.; "Field Mice: Extracting hand geometry from electric field measurements", IBM Systems Journal, vol. 35. Nos. 3&4, 1996. pp. 587–608.

Reference Data for Engineers: Radio, Electronics, Computer, and Communications 7th edition, E.C. Jordon editor in chief, Howard W. Sams, 1985, pp. 12–3 through 12–12.

*Primary Examiner*—Stephen W. Jackson
*Assistant Examiner*—Sharon Polk
(74) *Attorney, Agent, or Firm*—Dinnin & Dunn, P.C.

(57) ABSTRACT

An occupant detection system comprises an electric field sensor in the seat bottom of a vehicle seat for discriminating objects on the seat, and a seat weight sensor for sensing the force upon the seat. The electric field sensor discriminates normally seated occupants from other seating conditions, and disables a restraint actuator unless a normally seated occupant is present. The seat weight sensor disables the restraint actuator if force upon the seat is less than a threshold.

38 Claims, 8 Drawing Sheets

U.S. PATENT DOCUMENTS

| | | | |
|---|---|---|---|
| 5,164,709 A | 11/1992 | Lamberty et al. | 340/667 |
| 5,166,679 A | 11/1992 | Vranish et al. | 340/870.37 |
| 5,214,388 A | 5/1993 | Vranish et al. | 324/683 |
| 5,232,243 A | 8/1993 | Blackburn et al. | 280/732 |
| 5,247,261 A | 9/1993 | Gershenfeld | 324/716 |
| 5,247,281 A | 9/1993 | Facon et al. | 340/562 |
| 5,330,226 A | 7/1994 | Gentry et al. | 280/735 |
| 5,373,245 A | 12/1994 | Vranish | 324/662 |
| 5,398,185 A | 3/1995 | Omura | 364/424.05 |
| 5,411,289 A | 5/1995 | Smith et al. | 280/735 |
| 5,413,378 A | 5/1995 | Steffens, Jr. et al. | 280/735 |
| 5,439,249 A | 8/1995 | Steffens, Jr. et al. | 280/735 |
| 5,442,347 A | 8/1995 | Vranish | 340/870.37 |
| 5,446,391 A | 8/1995 | Aoki et al. | 324/661 |
| 5,446,661 A | 8/1995 | Gioutsos et al. | 364/424.05 |
| 5,454,591 A | 10/1995 | Mazur et al. | 280/735 |
| 5,474,327 A | 12/1995 | Schousek | 280/735 |
| 5,482,314 A | 1/1996 | Corrado et al. | 280/735 |
| 5,490,069 A | 2/1996 | Gioutsos et al. | 280/735 |
| 5,494,311 A | 2/1996 | Blackburn et al. | 280/735 |
| 5,515,933 A | 5/1996 | Meyer et al. | 180/273 |
| 5,525,843 A | 6/1996 | Howing | 307/9.1 |
| 5,528,698 A | 6/1996 | Kamei | 382/100 |
| 5,531,472 A | 7/1996 | Semchena et al. | 280/735 |
| 5,539,292 A | 7/1996 | Vranish | 318/568.21 |
| 5,549,323 A | 8/1996 | Davis | 280/728.3 |
| 5,570,903 A | 11/1996 | Meister et al. | 280/735 |
| 5,573,269 A | 11/1996 | Gentry et al. | 280/735 |
| 5,602,734 A | 2/1997 | Kithil | 364/424.055 |
| 5,612,876 A | 3/1997 | Zeidler et al. | 364/424.055 |
| 5,618,056 A | 4/1997 | Schoos et al. | 280/735 |
| 5,624,132 A | 4/1997 | Blackburn et al. | 280/735 |
| 5,691,693 A | 11/1997 | Kithil | 340/439 |
| 5,722,686 A | 3/1998 | Blackburn et al. | 280/735 |
| 5,724,024 A | 3/1998 | Sonderegger et al. | 340/562 |
| 5,726,581 A | 3/1998 | Vranish | 324/688 |
| 5,730,165 A | 3/1998 | Philipp | 137/1 |
| 5,748,473 A | 5/1998 | Breed et al. | 364/424.055 |
| 5,770,997 A | 6/1998 | Kleinberg et al. | 280/235 |
| 5,793,176 A | 8/1998 | Novak | 318/587 |
| 5,802,479 A | 9/1998 | Kithill et al. | 701/45 |
| 5,822,707 A | 10/1998 | Breed et al. | 701/49 |
| 5,844,415 A | 12/1998 | Gershenfeld et al. | 324/663 |
| 5,844,486 A | 12/1998 | Kithil et al. | 340/573 |
| 5,864,295 A | 1/1999 | Jarocha | 340/667 |
| 5,871,232 A * | 2/1999 | White | 280/735 |
| 5,890,085 A | 3/1999 | Corrado et al. | 701/47 |
| 5,901,978 A | 5/1999 | Breed et al. | 280/735 |
| 5,914,610 A | 6/1999 | Gershenfeld et al. | 324/663 |
| 5,948,031 A | 9/1999 | Jinno et al. | 701/45 |
| 5,954,360 A | 9/1999 | Griggs, III et al. | 280/735 |
| 5,964,478 A | 10/1999 | Stanley et al. | 280/735 |
| 6,014,602 A | 1/2000 | Kithil et al. | 701/45 |
| 6,024,378 A | 2/2000 | Fu | 280/735 |
| 6,043,736 A | 3/2000 | Sawahata et al. | 340/438 |
| 6,043,743 A | 3/2000 | Saito et al. | 340/562 |
| 6,066,954 A | 5/2000 | Gershenfeld et al. | 324/671 |
| 6,069,325 A | 5/2000 | Aoki | 177/136 |
| 6,135,494 A | 10/2000 | Lotito et al. | 280/731 |
| 6,158,768 A | 12/2000 | Steffens, Jr. et al. | 280/735 |
| 6,186,538 B1 | 2/2001 | Hamada et al. | 280/735 |
| 6,208,249 B1 | 3/2001 | Saito et al. | 340/561 |
| 6,250,671 B1 * | 6/2001 | Osmer et al. | 280/735 |
| 6,263,271 B1 | 7/2001 | Oka et al. | 701/45 |
| 6,286,861 B1 | 9/2001 | Cech et al. | 280/735 |
| 6,293,585 B1 | 9/2001 | Bruns et al. | 280/735 |
| 6,310,407 B1 | 10/2001 | Saito et al. | 307/10.1 |
| 6,323,444 B1 | 11/2001 | Aoki | 177/144 |
| 6,325,413 B2 | 12/2001 | Saito et al. | 280/735 |
| 6,329,914 B1 | 12/2001 | Shieh et al. | 340/561 |
| 6,356,187 B2 | 3/2002 | Jinno et al. | 340/438 |
| 6,366,200 B1 | 4/2002 | Aoki | 340/438 |

* cited by examiner

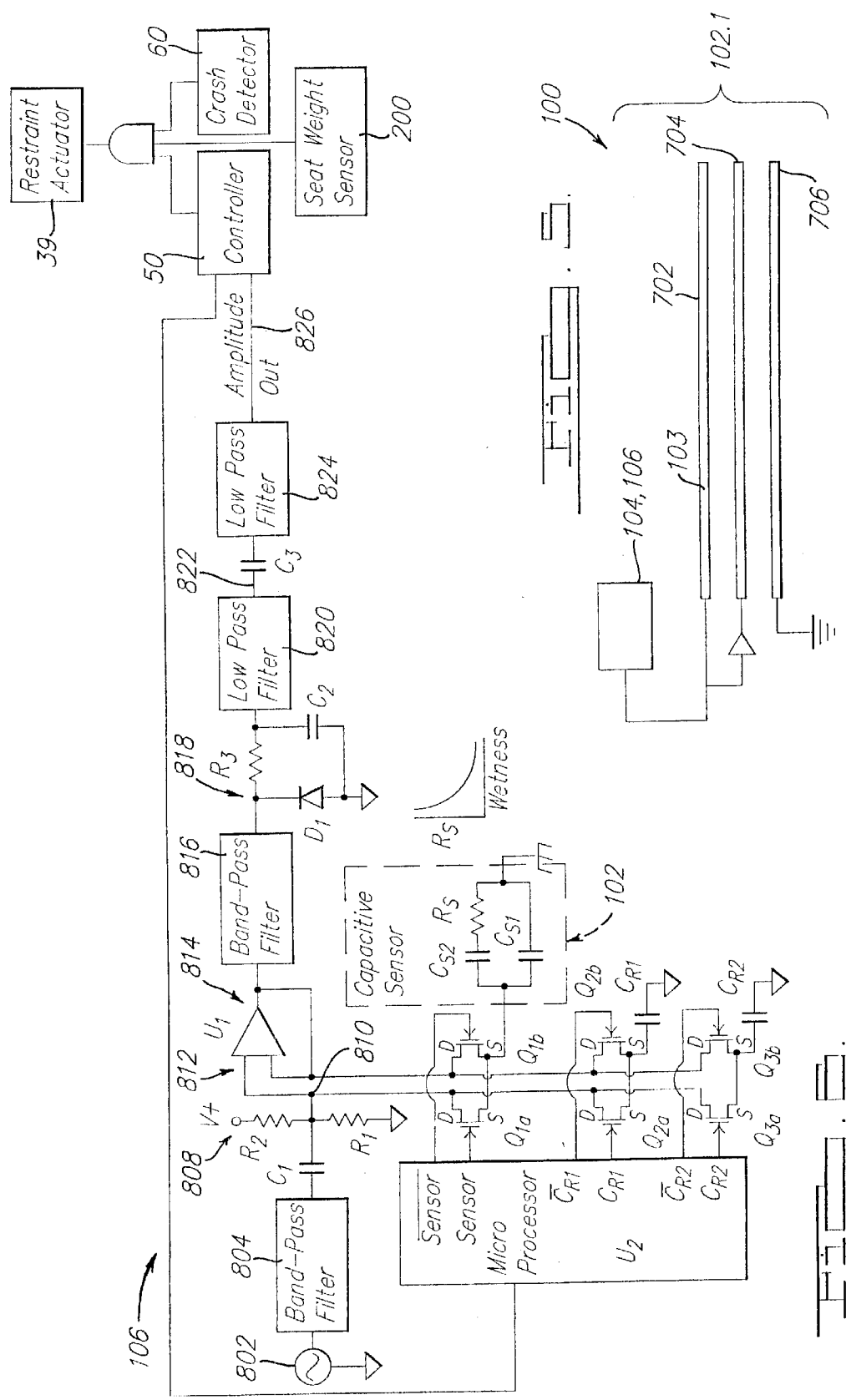

OCCUPANT DETECTION SYSTEM

CROSS-REFERENCE TO RELATED APPLICATIONS

The instant application claims the benefit of prior U.S. Provisional Application Serial No. 60/114,269 filed on Dec. 30, 1998.

The instant application also claims the benefit of prior U.S. Provisional Application Serial No. 60/133,630 filed on May 11, 1999.

The instant application also claims the benefit of prior U.S. Provisional Application Serial No. 60/133,632 filed on May 11, 1999.

The instant application also claims the benefit of prior U.S. Provisional Application Serial No. 60/143,761 filed on Jul. 13, 1999.

Co-pending, commonly owned U.S. application Ser. No. 09/474,600 entitled Occupant Detection System, filed on Dec. 29, 1999, entitled "Occupant Detection System", discloses an occupant detection system comprising an electric field sensor in a seat bottom, and a range/proximity sensor for sensing the presence of an object in a region proximate to a restraint actuator of a safety restraint system.

Co-pending, commonly owned U.S. application Ser. No. 09/474,473 entitled Occupant Detection System, filed on Dec. 29, 1999, entitled "Occupant Detection System", discloses an occupant detection system comprising an electric field sensor in a seat bottom, and a range/proximity sensor for sensing an occupant proximate to a seat back.

Co-pending, commonly owned U.S. application Ser. No. 09/474,673 entitled Occupant Detection System, filed on Dec. 29, 1999, entitled "Occupant Sensor", discloses an occupant sensor comprising an electric field sensor in a seat bottom, wherein the electric field sensor is adapted for discriminating child seats on the seat.

Co-pending, commonly owned U.S. application Ser. No. 09/474,469 entitled Occupant Detection System, filed on Dec. 29, 1999, entitled "Occupant Sensor", discloses an occupant sensor comprising an electric field sensor in a seat bottom, wherein the structure of the electric field sensor is adapted for improved consistency and for discriminating a wetness condition of the seat.

Co-pending, commonly owned U.S. application Ser. No. 09/066,547, entitled "Vehicle Occupant Discrimination System and Method", filed on Apr. 24, 1998 claiming benefit of U.S. Provisional Application Serial No. 60/044,829 filed on Apr. 25, 1997, hereinafter referred to as "ASL-136", discloses a system for detecting occupant position and type using a ranging sensor and a seat weight sensor.

TECHNICAL ART

The instant invention generally relates to occupant detection systems for controlling the activation of vehicular safety restraint systems and, more particularly, for determining the presence and position of an occupant for purposes of influencing the deployment of a safety restraint system responsive to a crash.

BACKGROUND OF THE INVENTION

A vehicle may contain automatic safety restraint actuators that are activated responsive to a vehicle crash for purposes of mitigating occupant injury. Examples of such automatic safety restraint actuators include air bags, seat belt pretensioners, and deployable knee bolsters. One objective of an automatic restraint system is to mitigate occupant injury, thereby not causing more injury with the automatic restraint system than would be caused by the crash had the automatic restraint system not been activated. Generally, it is desirable to only activate automatic safety restraint actuators when needed to mitigate injury because of the expense of replacing the associated components of the safety restraint system, and because of the potential for such activations to harm occupants. This is particularly true of air bag restraint systems, wherein occupants too close to the air bag at the time of deployment—i.e. out-of-position occupants—are vulnerable to injury or death from the deploying air bag even when the associated vehicle crash is relatively mild. For example, unbelted occupants subjected to severe pre-impact braking are particularly vulnerable to being out-of-position at the time of deployment. Moreover, occupants who are of small stature or with weak constitution, such as children, small adults or people with frail bones are particularly vulnerable to injury induced by the air bag inflator. Furthermore, infants properly secured in a normally positioned rear facing infant seat (RFIS) in proximity to a front seat passenger-side air bag are also vulnerable to injury or death from the deploying air bag because of the close proximity of the infant seat's rear surface to the air bag inflator module.

Yet another technique for mitigating injury to occupants by the air bag inflator is to control the activation of the inflator responsive to the presence and position of the occupant, thereby activating the inflator only when an occupant is positioned outside the associated at-risk zone of the inflator. NHTSA data suggests that severe injuries due to close proximity with the inflator can be reduced or eliminated if the air bag is disabled when the occupant is closer than approximately 4 to 10 inches from the inflator door. Such a system for disabling the air bag inflator requires an occupant sensor that is sufficiently sensitive and robust to make such a determination, while not causing the air bag inflator to be disabled when otherwise required for providing occupant restraint.

Except for some cases of oblique or side-impact crashes, it is generally desirable to not activate an automatic safety restraint actuator if an associated occupant is not present because of the otherwise unnecessary costs and inconveniences associated with the replacement of a deployed air bag inflation system. The prior art teaches various means for detecting the presence of an occupant, or the recognition of an inanimate object in the passenger-seat of a vehicle for purposes of implementing such a system. For example, weight sensors can be incorporated into the seat to detect the presence of an occupant.

Yet another technique for mitigating injury to occupants by the air bag inflator is to control the inflation rate or inflation capacity of the air bag inflator responsive to presence and position of an occupant. Such a control system would most preferentially be used in conjunction with a controllable inflation system responsive to crash severity, such as described above, wherein the occupant position inputs can be used to override otherwise overly aggressive air bag inflator controls which might otherwise be indicated by the particular crash severity level but which could be injurious to occupants of small stature or weight, or to infants in rear facing seats. Such a system for controlling the air bag inflator requires an occupant position sensor that is robust and sufficiently accurate, and that can distinguish and discriminate various occupant seating configurations and conditions.

U.S. Pat Nos. 5,071,160 and 5,118,134 teach the combination of sensing occupant position and/or velocity, and vehicle acceleration for purposes of controlling an inflator. Both of these patents teach by example the use of ultrasonic ranging to sense occupant position. U.S. Pat. No. 5,071,160 also teaches by example the use of a passive infrared occupant position sensor, while U.S. Pat. No. 5,118,134 teaches the use of a microwave sensor. U.S. Pat. No. 5,398,185 teaches the use of a plurality of occupant position sensors in a system for controlling safety restraint actuators in response thereto.

The prior art teaches the use of one or more ultrasonic beams reflected off the surface of an object to sense the location of the surface of the object. U.S. Pat. No. 5,330,226 teaches the combination of an ultrasonic ranging sensor mounted in the instrument panel and an overhead passive infrared sensor to sense occupant position for controlling a multi-stage air bag inflator or a vent valve connected thereto. U.S. Pat. Nos. 5,413,378, 5,439,249, and 5,626,359 teach ultrasonic sensors mounted in the dash and seat in combination with other seat sensors to detect the position and weight of the occupant for purposes of controlling an air bag inflator module. U.S. Pat. No. 5,482,314 teaches the combination of ultrasonic and passive infrared sensors together with associated signal processing for purposes of determining whether or not to deactivate a passive restraint system.

The prior art also teaches the use of infrared beams reflected off the surface of an object to sense the location of the surface of the object. U.S. Pat. Nos. 5,446,661, and 5,490,069 teach an infrared beam directed by a transmitter at a point of reflection on the object. A receiver detects the radiation scattered from the point of reflection, and measures the distance of the point of reflection from the transmitter based upon a triangulation of the transmitted and received beams for purposes of controlling the activation of a safety restraint system. These patents also teach the combination of an infrared beam occupant position sensor with an acceleration sensor for purposes of controlling an air bag inflation system. U.S. Pat. No. 5,549,323 teaches the incorporation of a light beam occupant sensor into an air bag door. Furthermore, infrared beam sensors are commonly used as range-finders in automatic focusing cameras.

The prior art of U.S. Pat. Nos. 4,625,329, 5,528,698, and 5,531,472 teach the use of imaging systems to detect occupant position, the later of two of which use this information for purposes of controlling an air bag inflator. U.S. Pat. Nos. 5,528,698, 5,454,591, 5,515,933, 5,570,903, and 5,618,056 teach various means of detecting the presence of a rear facing infant seat for purposes of disabling an associated air bag inflator.

The prior art also teaches the use of capacitive sensing to detect the presence, proximity, or position of an occupant. U.S. Pat. No. 3,740,567 teaches the use of electrodes incorporated into the base and back of the seat respectively, together with a capacitance responsive circuit, for purposes of discriminating between human occupants and animals or packages resting on an automobile seat. U.S. Pat. No. 3,898,472 teaches an occupant detection apparatus which includes a metalic electrode which is disposed to cooperate with the body of an automobile for form an occupant sensing capacitor, together with related circuitry which senses variations in the associated capacitance responsive to the presence of an occupant. U.S. Pat. No. 4,300,116 teaches the use of a capacitive sensor to detect people proximate the exterior of a vehicle. U.S. Pat. No. 4,796,013 teaches a capacitive occupancy detector wherein the capacitance is sensed between the base of the seat and the roof of the vehicle. U.S. Pat. No. 4,831,279 teaches a capacitance responsive control circuit for detecting transient capacitive changes related to the presence of a person. U.S. Pat. Nos. 4,980,519 and 5,214,388 teach the use of an array of capacitive sensors for detecting the proximity of an object. U.S. Pat. No. 5,247,261 teaches the use of an electric field responsive sensor to measure the position of a point with respect to at least one axis. U.S. Pat. No. 5,411,289 teaches the use of a capacitive sensor incorporated into the back rest of the seat to detect occupant presence. U.S. Pat. No. 5,525,843 teaches the use of electrodes incorporated into the base and back of the seat for purpose of detecting the presence of an occupant, whereby the electrodes are substantially insulated from the vehicle chassis when the detection circuit is active. U.S. Pat. Nos. 5,602,734 and 5,802,479 teach an array of electrodes mounted above the occupant for purposes of sensing occupant position based upon the influence of the occupant on the capacitance among the electrodes. U.S. Pat. No. 5,166,679 teaches a capacitive proximity sensor with a reflector driven at the same voltage as the sensing element to modify the sensing characteristic of the sensor. U.S. Pat. No. 5,770,997 teaches a capacitive vehicle occupant position sensing system wherein the sensor generates a reflected electric field for generating an output signal indicative of the presence of an object. U.S. Pat. Nos. 3,943,376, 3,898,472, 5,722,686, and 5,724,024 also teach capacitive-based systems for sensing occupants in motor vehicles.

In addition to methods taught by the above referenced U.S. Patents, the prior art also teaches various means of measuring capacitance, as for example given in the *Standard Handbook for Electrical Engineers* $12^{th}$ *edition*, D. G. Fink and H. W. Beaty editors, McGraw Hill, 1987, pp. 3-57 through 3-65 or in Reference Data for Engineers: Radio, Electronics, Computer, and Communications $7^{th}$ edition, E. C. Jordon editor in chief, Howard W. Sams, 1985, pp. 12-3 through 12-12, both included herein by reference.

The technical paper "Field mice: Extracting hand geometry from electric field measurements" by J. R. Smith, published in IBM Systems Journal, Vol. 35, Nos. 3 &4, 1996, pp. 587–608, incorporated herein by reference, describes the concept of Electric Field Sensing as used for making non-contact three-dimensional position measurements, and more particularly for sensing the position of a human hand for purposes of providing three dimensional positional inputs to a computer. What has commonly been referred to as capacitive sensing actually comprises the distinct mechanisms of what the author refers to as "loading mode", "shunt mode", and "transmit mode" which correspond to various possible electric current pathways. In the "shunt mode", a voltage oscillating at low frequency is applied to a transmit electrode, and the displacement current induced at a receive electrode is measured with a current amplifier, whereby the displacement current may be modified by the body being sensed. In the "loading mode", the object to be sensed modifies the capacitance of a transmit electrode relative to ground. In the "transmit mode", the transmit electrode is put in contact with the user's body, which then becomes a transmitter relative to a receiver, either by direct electrical connection or via capacitive coupling.

In one embodiment, a plurality of capacitive sensors are used to sense distances to the occupant, which in combination with the known locations of the fixed sensor elements are triangulated to locate the position of the occupant. One problem with such capacitive sensor arrangements is that they make use of the dielectric constant of known stability to detect the distance between a sensor and the occupant. Furthermore, the occupant position measurement tends to be associated with the center of mass of the sensed object.

However, the sensor can be confused by large metal devices or arms/limbs in close proximity. Therefore, while these sensors may perform satisfactorily as an automatic "on/off" switch to either disable the air bag inflator based upon occupant position, or enable the air bag inflator to be fired responsive to the activation signal from the vehicle crash sensor, the present embodiments of capacitive occupant position sensors may not be sufficiently accurate and robust to provide for controllable inflation based upon occupant position.

Occupant sensing systems that use capacitive sensors have significant problems when the sensor is wet and especially when the water near the sensor has good coupling to ground. The frequency dependent response of wet objects is discussed in an article describing capacitive sensing techniques by H. Philipp, entitled "The Charge Transfer Sensor", from the November, 1996 issue of *Sensors* magazine, incorporated by reference herein. One prior-art capacitive sensing system that uses sensors in the seat back and the seat bottom reportedly has problems because the seat back angle creates changes in the sensor signals independent of the occupant situation.

Sensors which measure the distance between a point of reference and the surface of an object, such as ultrasonic or infrared beam sensors, are also vulnerable to false measurements, as would be caused for example by the presence of the extremities of an occupant, or by the presence of an object such as a scarf or newspaper held thereby, in proximity to the sensor. These types of sensors could be used to monitor the at-risk zone proximate the inflator door, but are subject to several disadvantages. In particular, infrared based systems usually incorporate a beam much narrower than the volume of the at-risk zone such that multiple beams may be required to reliably sense an object anywhere inside the at-risk zone. The incorporation of multiple beams results in extra cost, complexity, and potentially slowed response. Furthermore, both infrared beam and ultrasonic base sensors would require a significant amount of hardware proximate the inflator door if the at-risk zone proximate the inflator is to be monitored.

Some prior-art occupant detection systems attempt to identify the type of occupant or object in the passenger side seat, for example to discriminate a rear facing infant seat from a normally seated adult in the passenger seat. This is a very challenging task as there are a large variety of possible situations. Sensor systems that use distance measurements to identify occupant situations attempt to use information about relatively few points in space to identify the type of occupant in the seat from among many possibilities. Since the outer surface of any particular situation can change dramatically by doing something as simple as tossing a blanket over the occupant or changing the seat position, results are sometimes unreliable. Sensing systems that use some form of range sensing across significant distances within the occupant compartment can be blocked by objects such as newspapers, maps or floating balloons. Some occupant detection systems incorporate a complex algorithm that, while sometimes compensating for the lack of direct sensory information, can cause unpredictable or anomalous performance.

One disadvantage of many occupant detection systems is that they do not gather the most relevant information to determine if the occupant is in an at-risk zone around the inflator module. Occupant detection systems that are mounted above the passenger and look down on the seat area have the wrong physical perspective to directly monitor the region around the inflator door. Even if an ideal set of roof mounted sensors can reliably determine the occupant's gross position—which is a very challenging task,—the actual volume between the inflator door and the occupant may be blocked to the sensors by the occupant's body. If the criteria for controlling the activation of an air bag inflator were in part based on the proximity of the occupant's body to the air bag inflator door, then overhead sensors simply cannot reliably obtain the relevant information. Systems that only use ultrasonic and optical sensing mechanisms can be blocked by newspapers. Ultrasonic sensors in some configuration will be affected by environmental conditions (temperature, humidity, altitude) because the speed of sound changes depending on the environment. Any sensing system that needs a clear line of sight between the sensor and the occupant requires the sensor to be visible to the occupant.

NHTSA recommends the use of towels under child seats to make them stable. Some prior-art sensing systems discriminate between child seats and occupants seated directly on the seat by their corresponding pressure patterns. A towel, or other object, placed under a child seat could make the child seat's pressure pattern appear like an occupant seated directly on the seat, but would have relatively little affect on the electric field sensor of the capacitive sensing subsystem.

Another problem with some prior-art occupant detection systems is their inability to disable the air bag during a pre-impact breaking event.

SUMMARY OF THE INVENTION

The instant invention overcomes the above-noted problems by providing an occupant detection system comprising an electric field sensor and a weight sensor. The electric field sensor comprises at least one electrode mountable in a seat bottom of a vehicle seat. The weight sensor provides a measure of weight of an occupant on the seat. Alternately, the weight sensor also provides a measure of the distribution of weight on the vehicle seat. A sensing circuit operatively coupled to the at least one electrode of the electric field sensor generates a signal responsive to an electric-field-influencing property of an object on the vehicle seat. A controller operatively coupled to the electric field sensor and to the weight sensor discriminates the type of object on the vehicle seat from the signal from the electric field sensor, and controls the activation of the safety restraint system responsive to the type of object, and responsive to the weight of the object. More particularly, the controller disables the restraint system if either a normally seated occupant is not detected on the vehicle seat, or if an occupant does not weigh enough to be considered an adult. The safety restraint system is enabled if an adult is seated directly on the vehicle seat.

Accordingly, one object of the instant invention is to provide an occupant detection system that can discriminate normally seated occupants from other seat occupancy conditions.

A further object of the instant invention is to provide a occupant detection system that can detect whether an occupant is susceptible to injury from a restraint actuator of a safety restraint system because of the weight of the occupant.

A yet further object of the instant invention is to provide an occupant detection system that can disable a restraint actuator if a normally seated occupant is not present on a vehicle seat or if an occupant weighs less than a threshold amount.

A yet further object of the instant invention is to provide an improved means of sensing the capacitance of an electrode in a vehicle seat of an electric field sensor for discriminating objects on a vehicle seat.

The electric field sensor in the seat bottom detects whether there is a large body immediately above the seat bottom cover as, for example, opposed to a child seat mounted on the passenger seat. The electric field sensor disables the air bag whenever no forward facing occupant is detected near the seat bottom, as would occur when any child seat (including RFIS, forward facing child seats and booster seats) is present on the seat, or when the seat is empty. Accordingly, the electric field sensor provides a simple direct measure of whether there is a normally seated forward facing occupant in the front passenger seat. The electric field sensor in the seat bottom has a short range and only senses an occupant when a large surface of the occupant is very close to the sensor. Occupants normally seated directly on the seat cover always have a large surface of their body very close to the sensor. Infants or children in child seats have all, or most, of their body elevated several inches off the seat bottom surface which has relatively little affect on the sensor, whereby a failure to detect a normally seated occupant causes the air bag to be disabled. The electric field sensor senses characteristics of the normally seated occupant that are readily distinguished from a child in a child seat on the passenger seat. This method of sensing is highly advantageous in that the sensor signal is dependent on the dielectric characteristics of the passenger and does not simply sense the outer profile of the occupant in the same way optical or ultrasonic sensors do, which profile can change dramatically simply by throwing a blanket over the occupant or changing the seat position. This is even true of an empty seat situation. The dielectric characteristics proximate the seat bottom are relatively unaffected by changes in the profile of occupants and objects on the seat, such as caused by blankets. The sensor moves with the seat bottom so seat position or seat back angle do not affect the deployment decision.

Objects that are placed under child seats to stabilize the child seats don't affect the deployment decision by the electric field sensor in the seat bottom, as can be the case for systems that incorporate seat weight sensors. A towel, or other object, placed under a child seat has relatively little effect on the electric field sensor of the electric field sensor in the seat bottom.

The electric field sensor is preferably implemented as a capacitive sensor, wherein the associated sensing circuit is adapted to measure the capacitance of at least one electrode of the sensor within the vehicle seat bottom. A plurality of electrodes may be used and separately measured so as to provide a measure of the distribution of an object on the vehicle seat bottom. The capacitance of the electrodes is relatively small, and the sensing circuit is adapted to provide calibrated capacitance measurements of the electrode by repeatedly comparing the measurement of the sensor electrode with measurements from one or more temperature stable reference capacitors. For example, a first reference capacitor is switched into the measurement circuit for a period of time. Then, an additional second capacitor is switched into the measurement circuit for an additional period of time, and the transient response to the combined capacitance is measured. Finally, the reference capacitors are switched out of the measurement circuit, and the at least one sensing electrode is switched into the measurement circuit so as to provide a measure of capacitance of the at least one sensing electrode. The sensing circuit is able to measure the absolute capacitance of the sensing electrode from this calibration incorporating two distinct and known reference capacitors in the measurement circuit. The sensing circuit is relatively robust and insensitive to temperature and temporal drift of the associated electronic components—excepting the reference capacitors—because the sensing circuit is adapted to filter out D.C. offsets, and measurements are made during transients. More over, the sensing circuit incorporated a voltage follower and associated FET switches in a manner by which the capacitive elements that are not being measured can be effectively isolated from those which are being measured.

The electric field sensor can be adapted with additional electrodes, for example in the form of a driven shield, so as to reduce the influence upon the capacitance of the sensing electrode of liquids wetting the vehicle seat.

A weight sensor alone can usually identify if the occupant in the passenger seat is an adult or is a child when that occupant is seated directly on the seat bottom. When a child is placed in a child seat, however, the weight of the child seat, the extra force down onto the seat by a tight lap belt or extra objects placed on the vehicle seat may make the child appear as an adult to a weight sensor. The use of an electric field sensor in the seat bottom allows the system to distinguish between situations where a child seat is used and situations where the occupant is not in a child seat. The weight sensor can incorporate strain gauges or other known systems and methods for sensing the weight of or upon a seat. In the instant invention provides for an improved system and method of seat weight sensing, wherein the weight information is used for detecting the occupant after first confirming with the electric field sensor that there is no child seat on the vehicle seat.

The weight sensor can be used along with the electric field sensor to diagnose failures in the weight sensor. If the electric field sensor identifies an occupant directly on the seat bottom and the weight sensor does not sense significant weight, there is probably something wrong with the weight sensor. The electric field sensor can also be used to identify situations where it is likely that there is very little weight on the seat. This could be used to check the offset of the weight sensor.

Since the electric field sensor and the weight sensor are mounted in the seat, a single electronics module can be shared with both sensors so as to reduce the overall cost of the system.

The instant invention directly measures characteristics that are important for assessing whether the air bag deployment could be dangerous, i.e. if there is an occupant seated directly on the seat bottom, and whether the occupant is larger than a small child. The air bag deployment decision is based on direct measurements and not on probabilistic predictions using indirect measures, resulting in more predictable and reliable performance. The instant invention disables the air bag for infants or children seated in infant or child seats on the passenger seat proximate the air bag. The instant invention provides a relatively simple system—unaffected by seat position or seat back angle—for disabling the passenger air bag in nearly all situations where the air bag can be a hazard. The occupant's head and torso need not be against the seat back for the system to accurately identify the occupant. Furthermore, objects that are placed under child seats to stabilize the child seats don's affect the air bag inflator deployment decision.

These and other objects, features, and advantages of the instant invention will be more fully understood after reading the following detailed description of the preferred embodiment with reference to the accompanying drawings and viewed in accordance with the appended claims

BRIEF DESCRIPTION OF THE DRAWINGS

FIG. 5 illustrates a cross section of one embodiment of an electric field sensor in accordance with the instant invention.

FIG. 6 illustrates a sensing circuit in accordance with the instant invention.

DETAILED DESCRIPTION OF THE PREFERRED EMBODIMENT(S)

Figure 1:
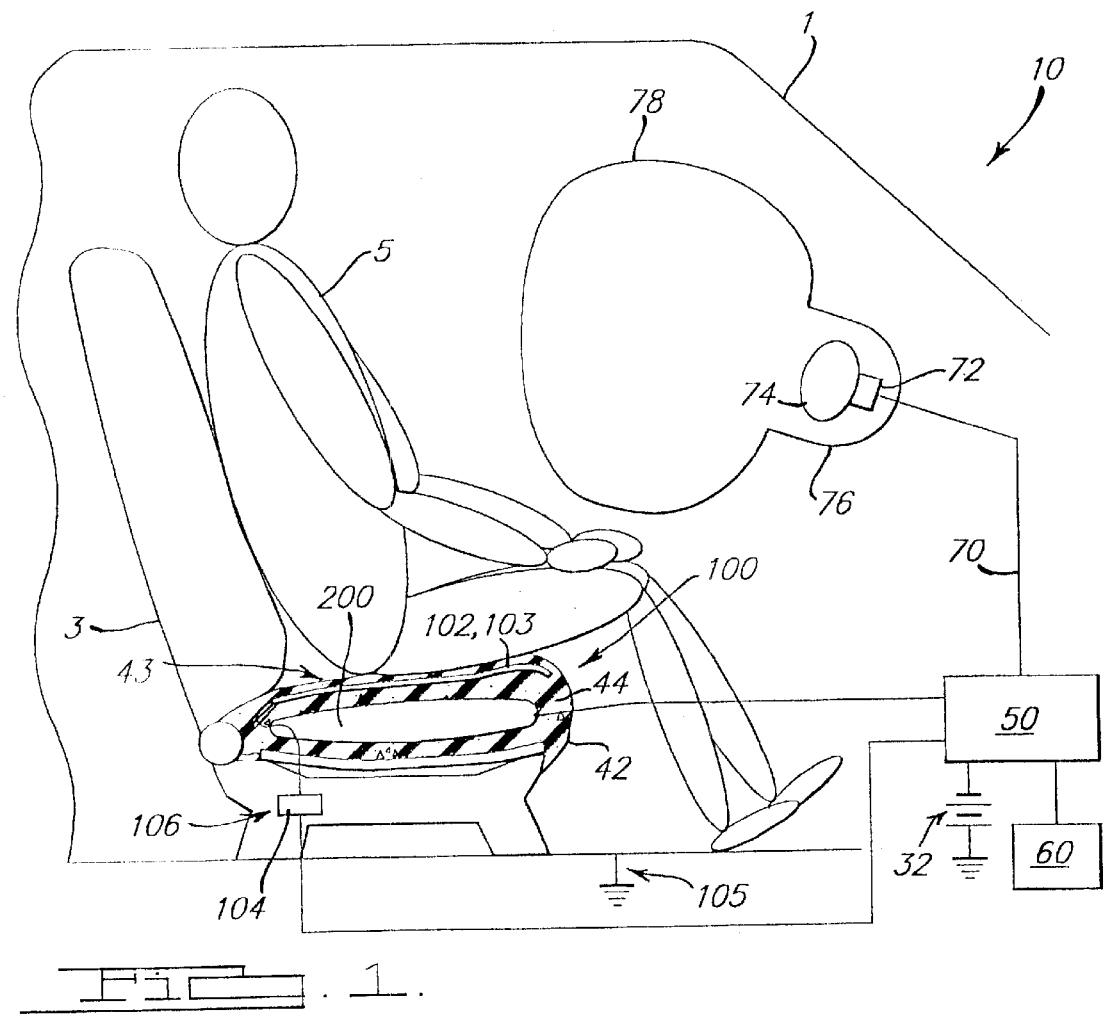
FIG. 1 illustrates one possible environment of the instant invention.

Referring to FIG. 1, an occupant detection system 10 comprises an electric field sensor 100 for identifying whether there is normally seated, forward facing occupant 5 on the seat 3 of a vehicle 1, and a seat weight sensor 200 for measuring the force upon the seat 3.

The electric field sensor 100 is placed in the seat bottom 42 under the seat cover 43 and close to the top of the foam cushion 44. Typically, the electric field sensor 100 is located in the seat bottom 42 of the passenger seat 3, although it may also be located in other seat locations where a child seat might be located that would need to be detected. The electric field sensor 100 comprises for example a capacitive sensing pad 102, comprising at least one electrode 103 (also referred to as at least one first electrode), connected to an electronics module 104 containing a sensing circuit 106 necessary to make the capacitance measurement, wherein preferably the capacitance of at least one electrode 103 is measured with respect to a circuit ground 105. The electric field sensor 100 is operatively coupled to a controller 50, which controls the actuation of the safety restraint system 38 responsive to a detected type and seating configuration of an object or occupant 5 on the seat 3.

The seat weight sensor 200 measures the force upon onto the seat 3. The seat weight sensor 200 can incorporate strain gauges or other technologies including pressure sensitive resistive contacts and pressure pattern sensors (i.e. IEE's force sensitive resistors or bend sensors) that weigh either the entire seat or just the weight on the seat bottom 42. In the case of a pressure sensing system that makes an assessment of the pressure pattern on the seat, the electric field sensor 100 can be used as an additional source of information that makes the system robust against complicating situations such as when towels are placed under child seats. The seat weight sensor 200 can be integrated with either the seat structure or the seat bottom. The electric field sensor 100 in the seat bottom 42 is readily adapted to systems incorporating force sensing resistors and bend sensors because both sensor technologies could use the same sensing mat.

In operation, an occupant 5 seated on the seat bottom 42 of seat 3 sufficiently increases the capacitance of the electric field sensor 100 so as to indicate that an occupant 5 is seated against the seat 3. The seat weight sensor 200 determines the weight of the occupant 5. The signals from the electric field sensor 100 and the seat weight sensor 200 are operatively coupled to the controller 50 which operates in accordance with known analog, digital, or microprocessor circuitry and software. A crash sensor 60 is also operatively coupled to the controller 50. Responsive to a crash detected by the crash sensor 60, if an occupant 5 is seated on the seat 3, the controller 50 generates a signal 70 which is operatively coupled to one or more initiators 72 of one or more gas generators 74 mounted in an air bag inflator module 76, thereby controlling the activation of the air bag inflator module 76 so as to inflate the air bag 78 as necessary to protect the occupant 5 from injury which might otherwise be caused by the crash. The electrical power necessary to carry out these operations is provided by a source of power 32, preferably the vehicle battery.

Figure 2:
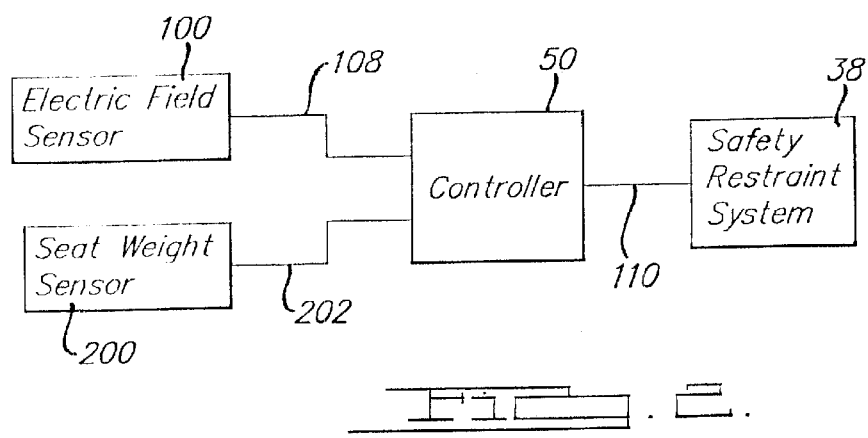
FIG. 2 is a block diagram of the instant invention.

FIG. 2 illustrates the general principle of instant invention. An electric field sensor 100 senses if an occupant 5 is seated on the seat 3 and outputs a signal 108 representative thereof to the controller 50. A seat weight sensor 200 senses the weight of the occupant 5 for determining if the occupant 5 is a normally sized adult, for which safety restraint actuation in a crash is desired, or child or small adult, for which safety restraints are preferably disabled, and outputs a seat weight signal 202 to the controller 50. The controller 50 determines from seat weight sensor 200 and the electric field sensor 100 whether or not to activate the safety restraint system 38. Alternately, if the capacitance sensed by the electric field sensor 100 is less than a threshold, the activation of the safety restraint system 38 is also inhibited. Otherwise, if a crash sensor 60 detects a crash of sufficient severity that the safety restraint system 38 should be activated, then the controller 50 generates an activation signal 110 to activate the safety restraint system 38. One of ordinary skill in the art will appreciate that the crash sensor 60 can be incorporated into the control processor 26.

Figure 3:
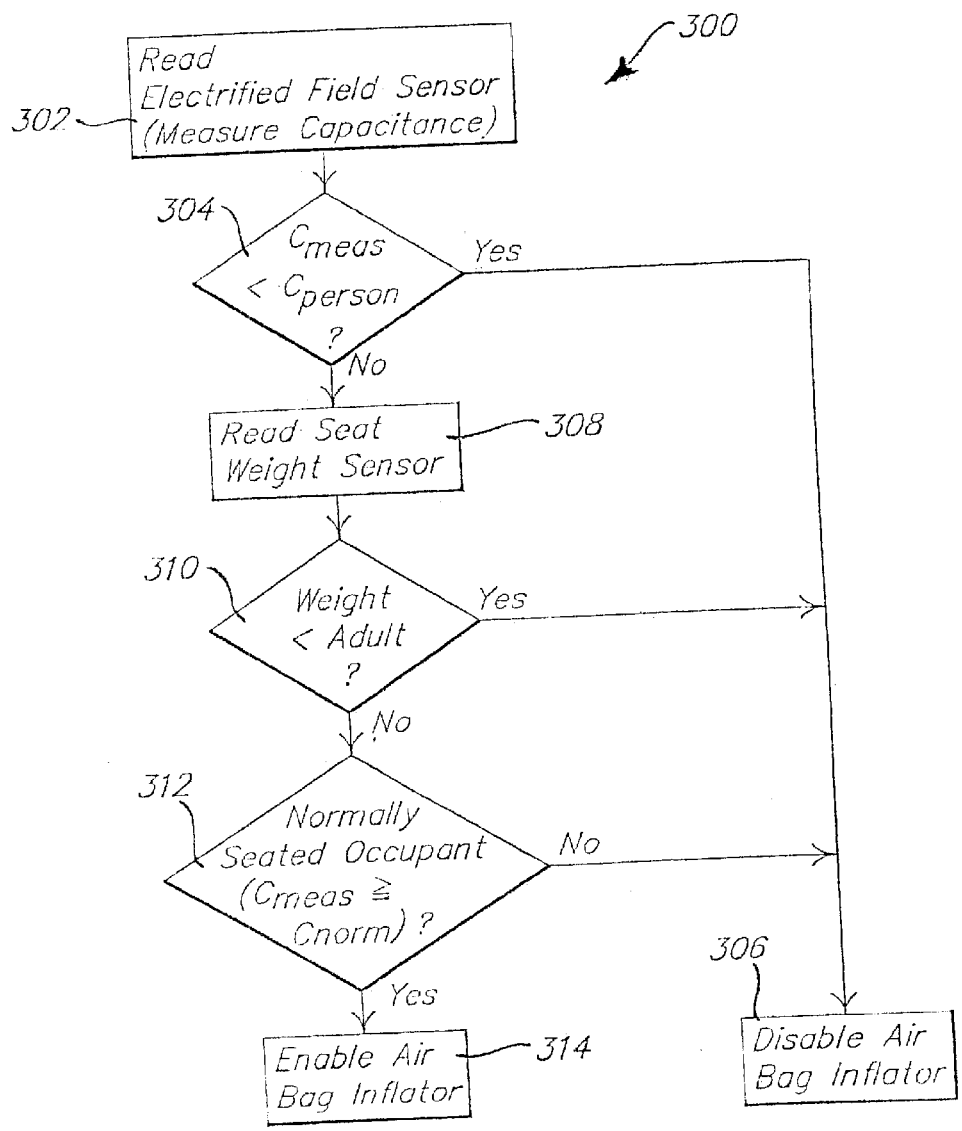
FIG. 3 illustrates an algorithm in accordance with the instant invention.

In accordance with the steps illustrated in FIG. 3, in step (302) the occupant detection system 10 reads the electric field sensor 100, and if in step (304) if the capacitance, $C_{mem}$, measured of the associated capacitive sensing pad 102 is less than a threshold—indicating that a person is not seated against the seat bottom, e.g. so that electric field sensor 100 is substantially non-responsive to an object more than 50 mm above said seat bottom—then the air bag inflator module 76 is disabled in step (306). Otherwise, in step (308) the occupant detection system 10 reads the seat weight sensor 200 to determine if the occupant 5 could be a small child, and if in step (310), if the seat weight is less than a threshold indicting the likelihood of a small child, the air bag inflator module 76 is disabled in step (306). Otherwise, if in step (312), if the capacitance $C_{meas}$ of the capacitive sensing pad 102 is greater than or equal to a threshold. $C_{norm}$—responsive to the presence of a large surface of a human body is seated directly on the seat base 40—and if the measured weight from the seat weight sensor 200 is greater than a threshold indicating that the occupant 5 is likely an adult, then the air bag inflator module 76 is enabled in step (314). Otherwise, the air bag inflator module 76 is disabled in step (306).

Figure 4:
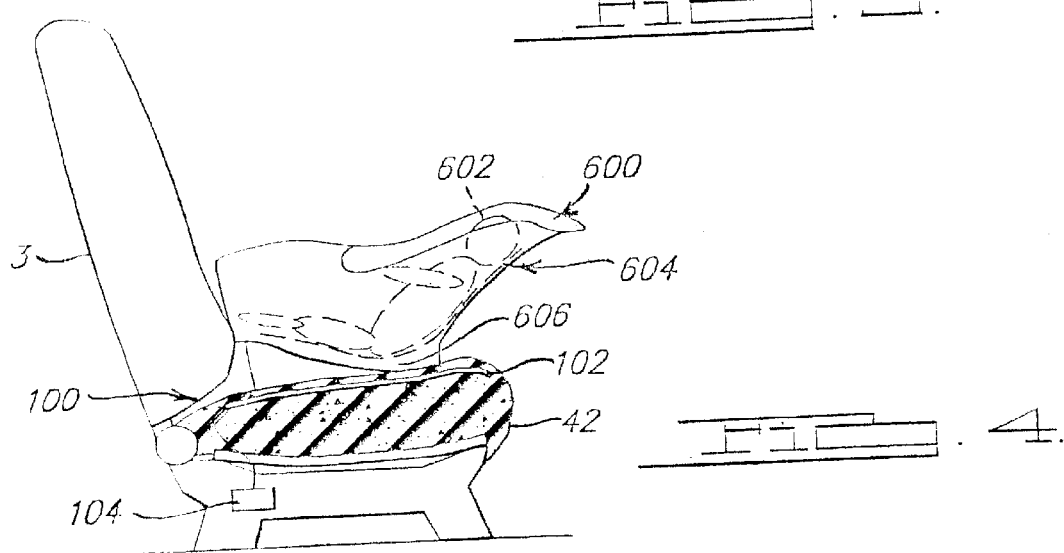
FIG. 4 illustrates a child in a typical rear facing child seat placed on a vehicle seat incorporating an electric field sensor in accordance with the instant invention.

The occupant detection system 10 is effective in sensing a rear facing child or infant seat (RFIS) 600 because the child 602 in a rear facing child seat never has a large surface of its body very near to the seat bottom 42 and the capacitive sensing pad 102 contained therein. For example, FIG. 4 illustrates the orientation of a child 602 in a typical rear facing infant seat 600. The seating contour 604 inside the rear facing child or infant seat 600 is such that the buttocks of the child 602 is closest to the seat bottom 42 of the vehicle seat 3. Usually there is a significant gap 606, up to several inches, between the child 602 and the seat bottom 42 of the vehicle seat 3. Since child seats 600 are made of plastic, the seats themselves are not sensed directly by the electric field sensor 100. Even for rear facing infant seats 600 for which the gap 606 between the child 602 and the seat bottom 42 of the vehicle seat 3 is relatively small, the inside seating contour 604 still creates a significant gap between the capacitive sensing pad 102 and all parts of the child 602 except the buttocks. Since only a small portion of the surface of the child 602 is near to the capacitive sensing pad 102, the capacitance measured by the electric field sensor 100 is relatively low, and more particularly, less than the threshold capacitance, $C_{norm}$.

One potential weakness of an electric field sensor 100 is the significant affect that liquids proximate to the electrode 103 can have on the capacitance of the electrode 103 with respect to the circuit ground 105, or with respect to a second electrode. For example, liquids spilled on and absorbed by the foam cushion 44 can increase the capacitance of the electrode 103 with respect to the circuit ground 105. Referring to FIG. 5, the electric field sensor 100 can be adapted to reduce the affect of a wetting of the foam cushion 44 by incorporating a driven shield 704 (also referred to as at least one second electrode) and/or a ground plane 706 (also referred to as at least one third electrode) under the sensing electrode 702 (also referred to as the at least one first electrode) in an alternate capacitive sensing pad 102.1. The driven shield 704 is simply a second conductor under the conductor of the sensing electrode 702 that is driven at the same potential as the sensing electrode 702. The result will be that there is no electric field between the sensing electrode 702 and the driven shield 704. The driven shield 704 eliminates the capacitance sensing capability of the capacitive sensing pad 102.1 on the side of the sensing electrode 702 where the driven shield 704 is located. The capacitive ;sensing pad 102.1 is further improved with a ground plane 706 under the driven shield 704 so that the circuit driving the driven shield 704 drives a consistent load.

As distinguished from the capacitive proximity sensor of U.S. Pat. No. 5,166,679, the driven shield 704 and/or ground plane 706 are for example near to or slightly larger than the sensing electrode 702, and are provided to minimize the effects of liquid in the foam cushion 44 below the driven shield 704 and/or ground plane 706 on the capacitance of the sensing electrode 702, rather than to extend the range and sensitivity of the electric field sensor. The driven shield 704 and the sensing electrode 702 essentially covers the entire area to be sensed on the seat 3.

Alternately, the elements of the capacitive sensing pad 102 distributed sparsely across the seat 3, thereby covering a smaller area than the entire area to be sensed on the seat 3. One of ordinary skill in the art will recognize that the capacitive sensing pad 102, and the elements thereof, can be embodied in a variety of shapes without departing from the teachings of the instant invention.

The capacitance of the capacitive sensing pad 102 relative to circuit ground 105 is relatively small, for example less than about 300 picofarads. The temperature range that is possible in an automotive environment can significantly affect the components of the sensing circuit 106, causing drift that can be erroneously interpreted as a measurement that could enable the restraint system 30 to be erroneously enabled by the controller 50. The effects of this drift can be mitigated by incorporating a temperature stable reference capacitor in the sensing circuit 106 that is switched in place of the sensing electrode 103 so as to provide a means for making comparative capacitive measurements. Since the reference capacitor can be selected such that its value is very stable over temperature, any drift can be identified and quantified, and this information can be used to alter the decision threshold.

Referring to FIG. 6, illustrating an exemplary sensing circuit 106, an oscillator 802 generates an oscillating signal, for example a sinusoidal signal, that is filtered by a first bandpass filter 804 so as to create a first oscillating signal 806. The first oscillating signal 806 is applied to a capacitive voltage divider 808 comprising capacitor C1, resistors R1 and R2, and one or more capacitive elements to be measured, selected from the group consisting of the capacitive sensing pad 102, a first reference capacitor CR1, and a second reference capacitor CR2, wherein the capacitive elements to be measured are included or excluded responsive to the states of respective FET switches Q1*a*, Q1*b*, Q2*a*, Q2*b*, Q3*a*, and Q3*b*. Capacitor C1, resistors R1 and R2 and the FET switches Q1*a*, Q2*a*, and Q3*a*—that when active switch in the respective capacitive elements to be measured,—are all connected to one another at a first node 810, which is connected to the input 812 of a voltage follower U1. The output 814 of the voltage follower U1 is connected to FET switches Q1*b*, Q2*b*, and Q3*b* that when active, switch out the respective capacitive elements so as to not be measured. The activation of the FET switch elements of FET switch pairs Q1*a* and Q1*b*, Q2*a* and Q2*b*, and Q3*a* and Q3*b* are respectively mutually exclusive. For example if FET switch Q1*a* is activated or closed, then FET switch Q1*b* is deactivated or open. A capacitive element being measured adds to the capacitance at the first node, thereby affecting the strength of the signal at the input 12 to the voltage follower U1. A capacitive element not being measured is disconnected from the first node by its respective first FET switch element, and connected to the output 814 of the voltage follower U1 by its respective second FET switch element, wherein, in accordance with the characteristics of the associated operational amplifier of the voltage follower U1, the output 814 of the voltage follower U1 follows the signal of the first node without that respective capacitive element connected, and voltage follower U1 provides a current through the associated capacitive element through the second respective FET switch element. Moreover, when the respective second FET switch element is activated, the source and drain of the respective first FET switch element are separately coupled to the respective operational amplifier inputs, so that to each is applied the same potential, thereby eliminating the affect of the capacitance of the respective first FET switch on the capacitance measurement.

The output 814 of the voltage follower U1 is then coupled to a second bandpass filter 816 of the same pass band as the first bandpass filter 804, the output of which is detected by a detector 818 comprising diode D1, resistor R3 and capacitor C2, and filtered by a first low pass filter 820. The output 822 of the first low pass filter 820 has a DC component corresponding to the capacitance at the first node 810. This DC component is filtered by blocking capacitor C3, and the resulting signal is filtered by a second low pass filter 824 to provide the amplitude 826 of the oscillating signal at the first node 810, which is related to the total capacitance at that location. The blocking capacitor C3 is adapted so as to provide a transitory measurement of the amplitude 826.

Figure 7:
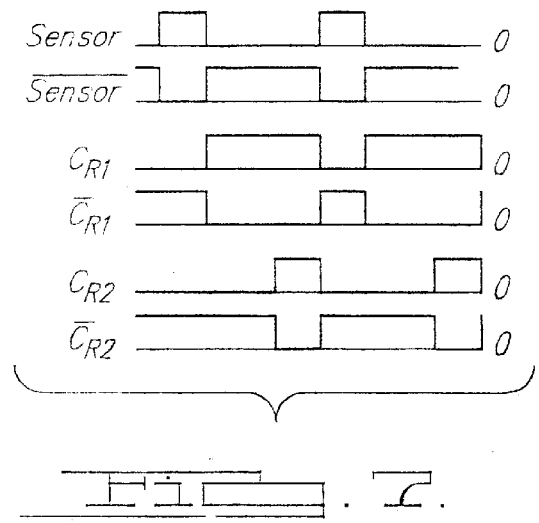
FIG. 7 illustrates the operation of various elements of the sensing circuit of FIG. 6.

In operation, a microprocessor U2 controls the activation of FET switches Q1*a*, Q1*b*, Q2*a*, Q2*b*, and Q3*b*, for example in accordance with the control logic illustrated in FIG. 7. With the first reference capacitor CR1 switched in by microprocessor U2, i.e. with Q2*a* activated and Q2*b* deactivated, the controller measures a first amplitude. Then with the second reference capacitor CR2 also switched in by microprocessor U2, the controller measures a second amplitude corresponding to an incremental increase of capacitance at the first node by the capacitance of capacitor CR2. Then the controller computes a sensitivity factor in Volts/picofarad given the known values of capacitance of capacitors CR1 and CR2. Then, the microprocessor U2 switches out the first CR1 and second reference capacitor CR2, switches in the capacitive sensing pad 102, measures a third amplitude, and calculates the capacitance of the capacitive sensing pad 102 using the calculated sensitivity factor. The controller 50 compares this capacitance with a threshold so as to discriminate normally seated occupants from other seat occupancy conditions. If a normally seated occupant 5 is present, and if the seat weight sensor 200 does not disable the safety restraint system, the restraint actuator 39 is actuated responsive to the detection of a crash by the crash sensor 60. Whereas FIG. 6 illustrates the microprocessor U2 and controller 50 as separate elements that communicate with one another, alternate arrangements are possible. For example, both may be combined in one controller, or the microprocessor may be adapted to sense the amplitude measurements, calculate the capacitance of the capacitive sensing pad, and then output only this capacitance value to the controller 50.

The capacitive sensing pad 102 is modeled as a first capacitance CS1 in parallel with a series combination of a second capacitance CS2 and a resistance RS, wherein the resistance RS if inversely related to the wetness of the seat. The capacitance of the capacitive sensor is dominated by CS1 for a dry seat, but becomes affected by CS2 and RS as the wetness of the seat increases.

The values of capacitance for capacitors C1, CR1, and CR2 are adapted to maximize the dynamic range of the capacitance measurement over the range of expected capacitances of the capacitive sensor 102.

While a seat weight sensor 200 may have difficulties distinguishing between the 60 lb. child on a ten pound booster seat from a small adult, the electric field sensor 100 identifies that there is no adult seated directly on the seat bottom 42 and the controller 50 disables the restraint actuator 39. Also, if the lap belt were very tight on a rear facing infant seat, the force on the seat may be very high, but the electric field sensor 100 identifies that there is no adult seated directly on the seat bottom 42 and the controller 50 disables the restraint actuator 39. If a child is seated directly on the seat bottom 42, the seat weight sensor 200 provides a reliable measurement that can be used to make the deployment decision.

Figure 8:
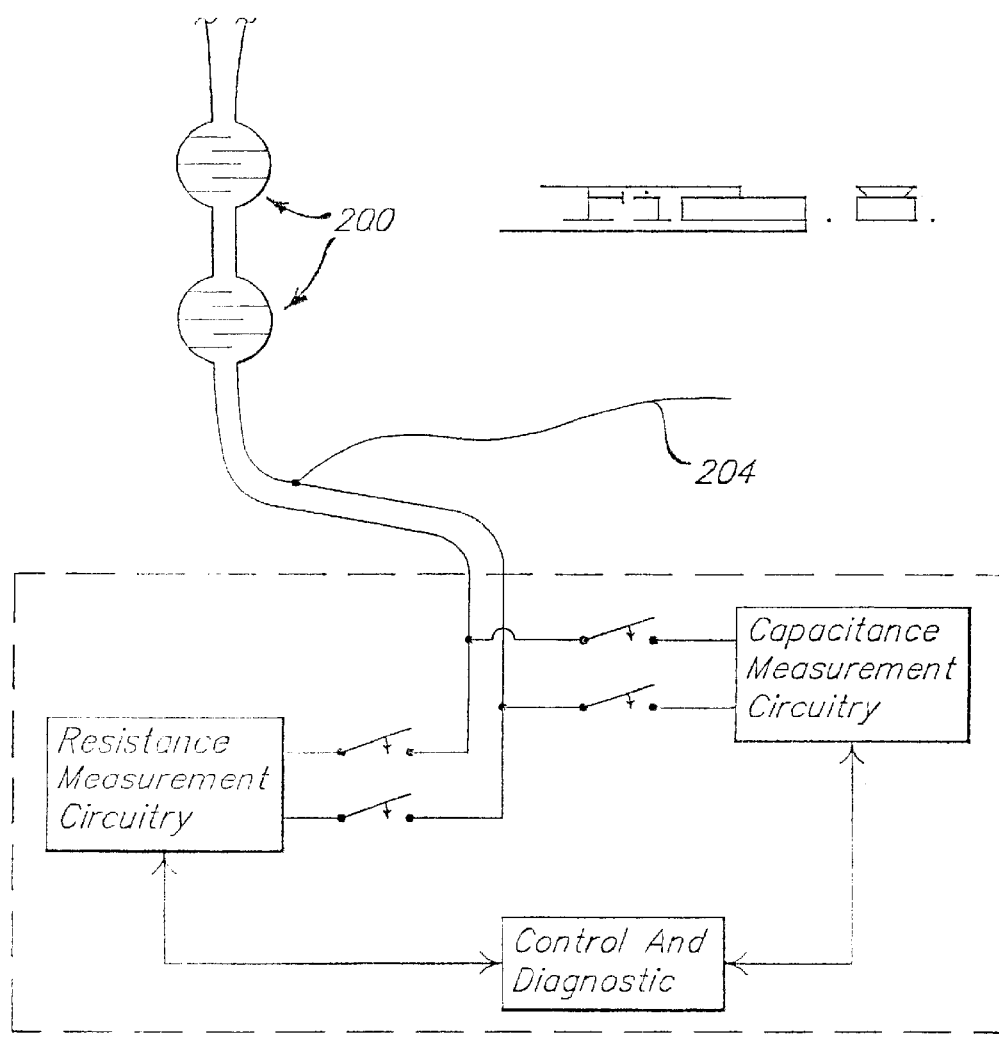
FIG. 8 illustrates an alternate arrangement of the instant invention wherein a seat weight sensor also functions as a capacitive sensor.

Referring to FIG. 8, the instant invention may be adapted so that a common sensor element serves as both the seat weight sensor 200 and the capacitive sensor 100. For example, a force sensitive resistive element of a bend sensor may be used as the seat weight sensor 200. These weight sensors are commercially available, for example from Bosch, Siemans, IEE, and Flexpoint Inc., and comprise a plurality of electrodes or leads that are operatively connected to the associated weight sensing element. Either the leads or electrodes, or the sensors themselves, can be used as an electrode of the associated capacitive sensor 100. Alternately, an additional conductive trace 204 can be placed on the underlying sensing mat, wherein the additional conductive trace 204 is connected to one of signal leads to the weight sensor. This additional conductive trace 204 does not affect the weight measurement, and is positioned on the seat for best capacitive performance, such as the best discrimination between a child seat and a normally seated occupant 5. Accordingly, the resistance between the signal leads of the combined seat weight sensor/capacitive sensor provides a measure of seat weight. The capacitance between the signal leads, or between one of the signal leads and a separate ground reference, provides a measure of capacitance of the capacitive sensor 100, which is influenced by the dielectric properties of objects or occupants on the seat. The signal leads are switched to respective resistance and capacitance measurement circuitry by respective switches, typically semiconductor switches such as field effect transistors. The resistance and capacitance measurement circuits are respectively operatively coupled to control and diagnostic circuitry for controlling the safety restraint system. Accordingly, the instant invention provides for the combined functionality of both a seat weight sensor 200 and an electric field sensor 100 by adding additional circuitry to an existing seat weight sensing system.

One feature of the instant invention is the ability to make a diagnosis of a major malfunction of the seat weight sensor 200. If the electric field sensor 100 senses a large occupant 5 and the seat weight sensor 200 does not sense a significant weight, then there is probably a malfunction the seat weight sensor 200.

Figure 9A:
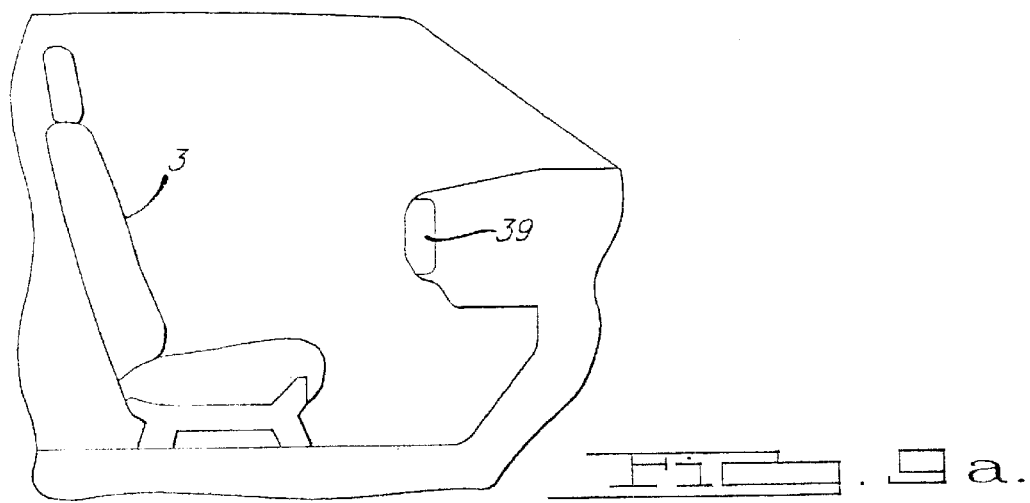
FIGS. 9a–j illustrates various seat occupancy scenarios sensed by the instant invention.
Figure 9B:
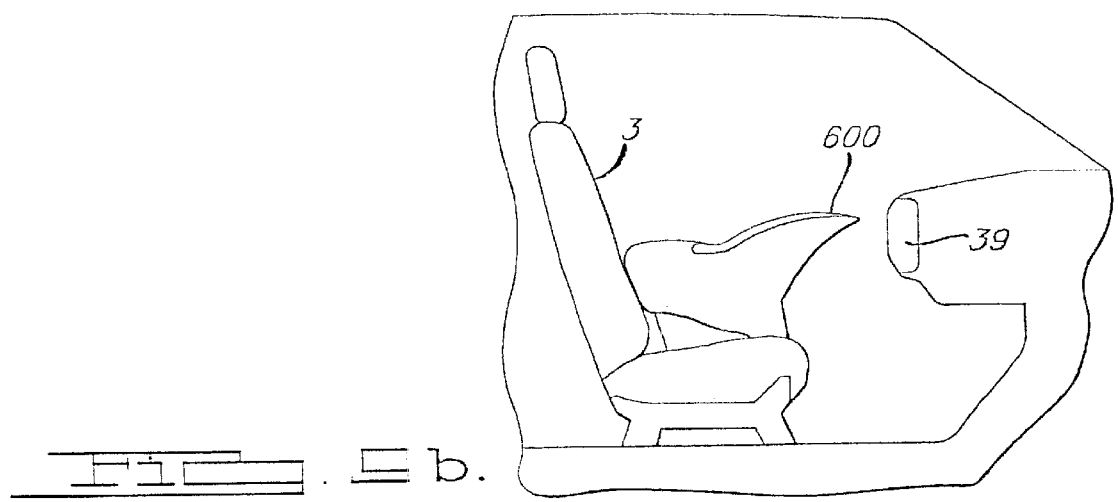
Figure 9C:
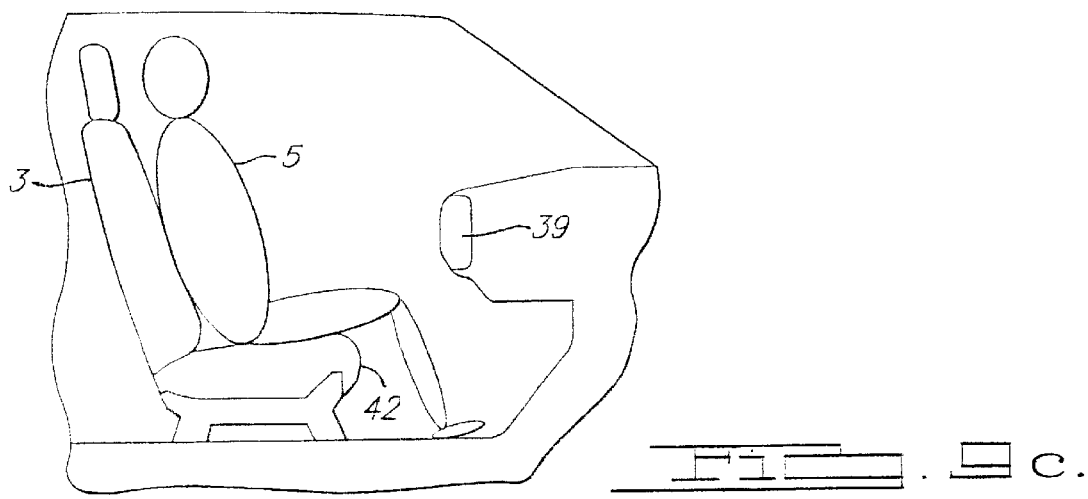
Figure 9D:
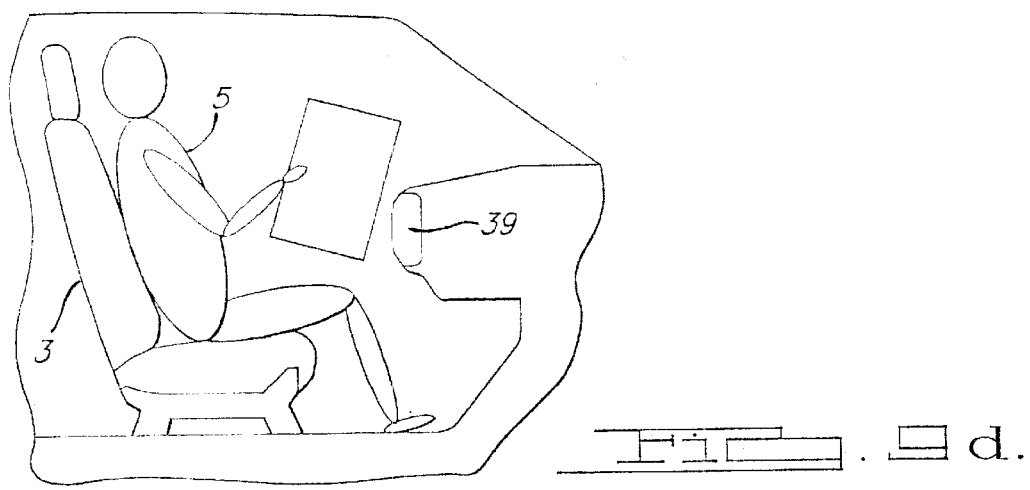
Figure 9E:
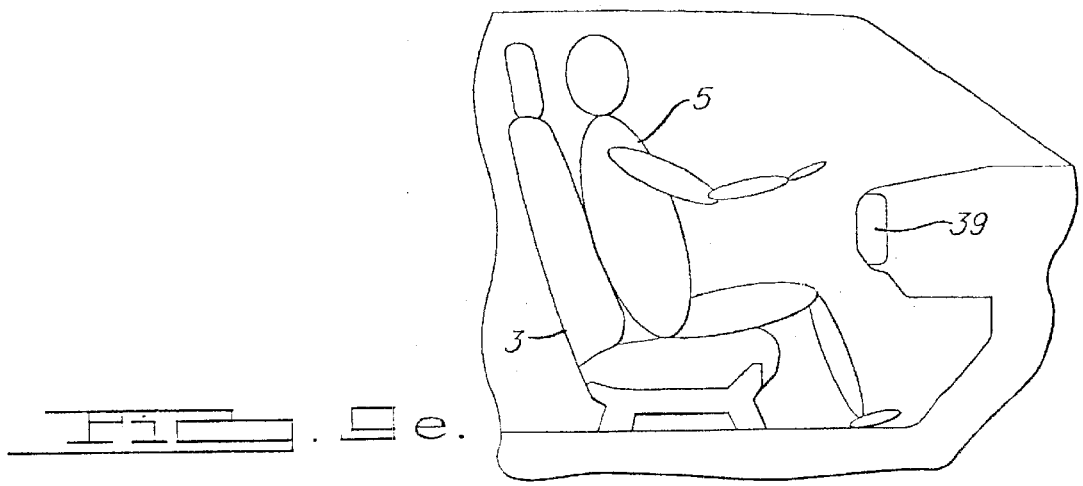
Figure 9F:
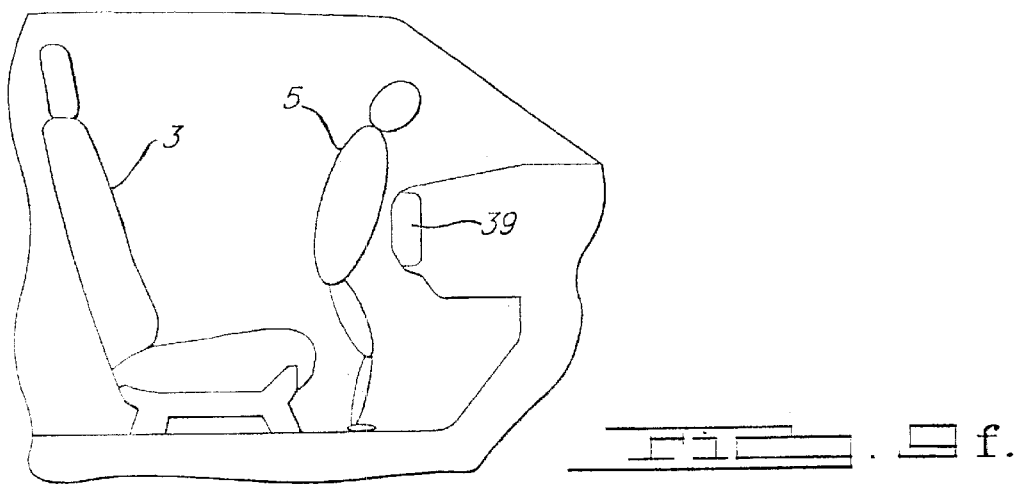
Figure 9G:
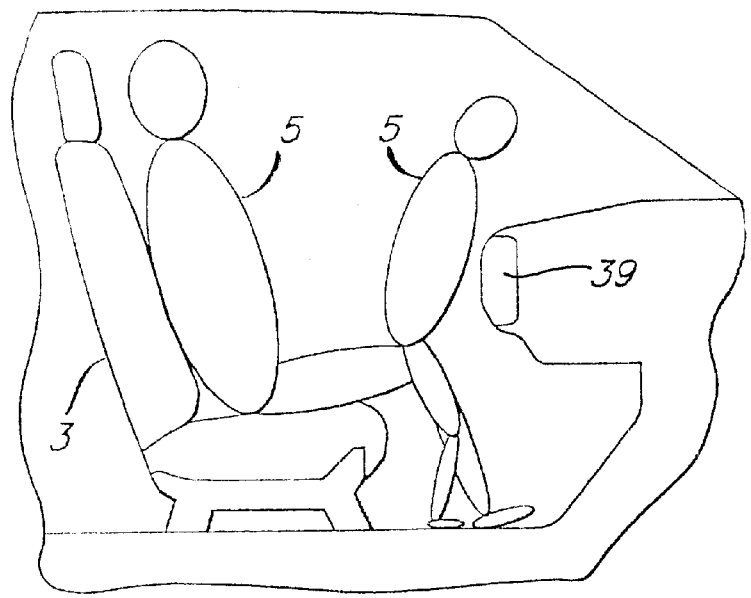
Figure 9H:
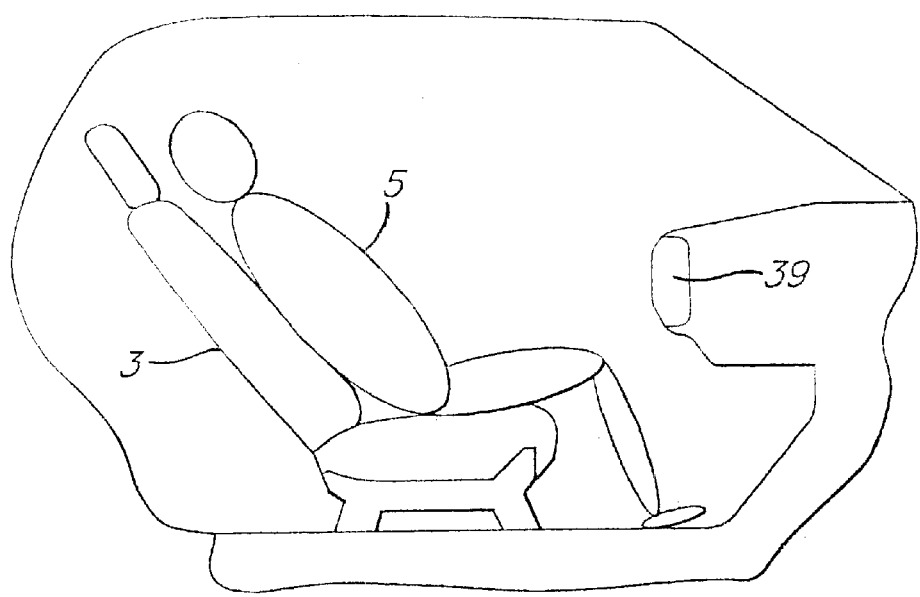
Figure 9I:
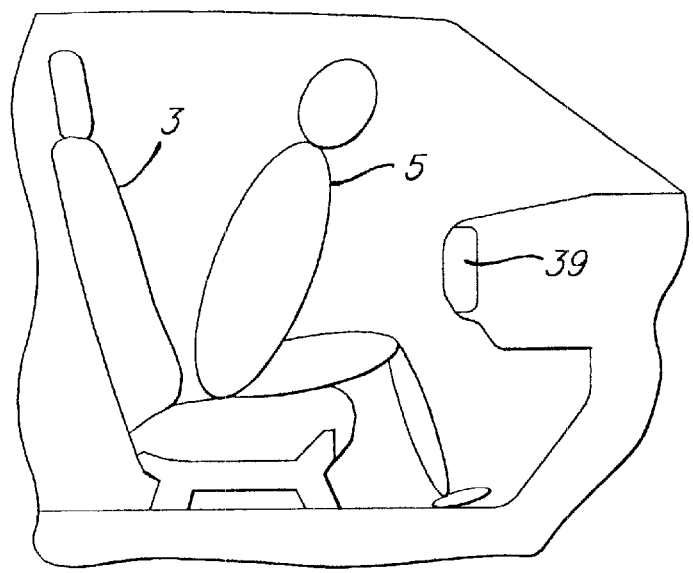
Figure 9J:
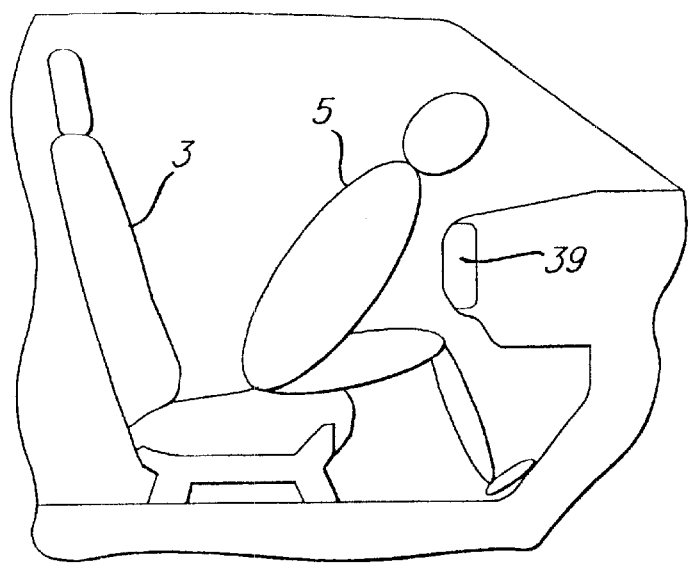

Referring to FIGS. 9a–j, the occupant detection system 10 of the instant invention provides the appropriate enable decision for nearly all typical situations. For example, in FIG. 9a illustrating an empty seat and in FIG. 9b illustrating a rear facing infant seat on the vehicle seat, the electric field sensor 100 would disable the restraint actuator 39. In FIG. 9c, illustrating a normally seated adult; in FIG. 9h, illustrating an adult seated in a reclined position; in FIG. 9d, illustrating a normally seated adult reading a newspaper; and in FIG. 9e, illustrating a normally seated adult with a hand in the at-risk zone, the restraint actuator 39 would be enabled because the electric field sensor 100 would detect an occupant 5 seated on the seat bottom 42 and the seat weight sensor 200 would detect the presence of an adult. In FIG. 9f, illustrating a small occupant 5 standing proximate to the restraint actuator 39, the restraint actuator 39 would be disabled by both the electric field sensor 100 and by the seat weight sensor 200, both sensing an empty seat. In FIG. 9g, illustrating a normally seated adult and a standing child, the restraint actuator 39 would be improperly enabled, which indicates the need for an additional means of sensing this condition so as to avoid injuring the standing child. In FIG. 9j, illustrating an adult leaning and seated forward, the restraint actuator 39 would be disabled by the seat weight sensor 200 if the weight sensed by the seat weight sensor 200 is less than a threshold, or by the electric field sensor 100 if the associated capacitance is sufficiently different from that of a normally seated occupant, or if either the electric field sensor 100 or the seat weight sensor 200 were adapted to measure the distribution of weight on the seat bottom 42. Finally, in FIG. 9i, illustrating a seated adult leaning forward, the restraint actuator 39 would be enabled by the electric field sensor 100, but possibly with reduced power if either the electric field sensor 100 or the seat weight sensor 200 were adapted to measure the distribution of weight on the seat bottom 42.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of any claims which are derivable from the description herein, and any and all equivalents thereof.

We claim:

1. A system for detecting an occupant in a vehicle with a safety restraint system, comprising:
    a. a first electric field sensor comprising at least one first electrode mountable in a seat bottom of a vehicle seat, wherein said first electric field sensor is responsive to at least one electric-field-influencing property of an object on said vehicle seat;
    b. a first sensing circuit operatively coupled to at least one said first electrode of said first electric field sensor wherein said first sensing circuit generates a first signal responsive to said at least one electric-field-influencing property of an object proximate to said first electric field sensor, wherein said first sensing circuit further comprises:
        i. a reference capacitor; and
        ii. a switch for switching said reference capacitor in place of said first electric field sensor, wherein said first sensing circuit compares the measurement of said reference capacitor with the measurement of said first electric field sensor, calibrates said first signal responsive to said comparison;
    c. a weight sensor operatively coupleable to said vehicle seat for measuring the weight of an object upon said vehicle seat; and
    d. a controller operatively coupled to said first electric field sensor and to said weight sensor, wherein said controller discriminates a type of object on said vehicle seat responsive to said first signal and to said weight sensor, and said controller controls the actuation of the safety restraint system responsive to said type of object.

2. A system for detecting an occupant in a vehicle with a safety restraint system as recited in claim 1, wherein said at least one first electrode is adapted so that the capacitance of said at least one first electrode with respect to a circuit ground is substantially greater for a seating condition selected from the group consisting of an occupant seated in substantially normal seating position on the vehicle seat and a large body immediately above said seat bottom; than for a seating condition selected from the group consisting of an empty said vehicle seat, an infant seat on said vehicle seat, a child seat on said vehicle seat, a booster seat on said vehicle seat, an infant seated in an infant seat on said vehicle seat, a child seated in a child seat on said vehicle seat, a child seated on a booster seat on said vehicle seat, and an occupant on said vehicle seat in a position that is substantially different from a normal seating position.

3. A system for detecting an occupant in a vehicle with a safety restraint system as recited in claim 1, wherein the size of said at least one first electrode is substantially equal to an area to be sensed on said vehicle seat.

4. A system for detecting an occupant in a vehicle with a safety restraint system as recited in claim 1, wherein said first electric field sensor is substantially non-responsive to an object more than 50 mm above said seat bottom.

5. A system for detecting an occupant in a vehicle with a safety restraint system as recited in claim 1, wherein said at least one first electrode is mounted proximate to the location of an object selected from the group consisting of an infant seat on said vehicle seat, a child seat on said vehicle seat, a booster seat on said vehicle seat, and an occupant seated on said vehicle seat.

6. A system for detecting an occupant in a vehicle with a safety restraint system as recited in claim 1, wherein said at least one first electrode is mounted under a seat cover of said vehicle seat.

7. A system for detecting an occupant in a vehicle with a safety restraint system as recited in claim 1, wherein said at least one first electrode is mounted above a foam cushion in said vehicle seat.

8. A system for detecting an occupant in a vehicle with a safety restraint system as recited in claim 1, wherein said at least one electric-field-influencing property comprise a dielectric characteristic.

9. A system for detecting an occupant in a vehicle with a safety restraint system as recited in claim 1, wherein said vehicle seat comprises a seat frame, and said seat frame is connected to a circuit ground.

10. A system for detecting an occupant in a vehicle with a safety restraint system as recited in claim 1, wherein said first electric field sensor is adapted to mitigate the affect of a liquid wetting said vehicle seat.

11. A system for detecting an occupant in a vehicle with a safety restraint system as recited in claim 1, wherein said first sensing circuit is operatively coupled to each said at least one first electrode so as to provide a measure of the distribution of an object on said vehicle seat.

12. A system for detecting an occupant in a vehicle with a safety restraint system as recited in claim 1, wherein said first electric field sensor further comprises at least one second electrode and at least one third electrode, wherein said at least one third electrode is located between said at least one first electrode and a foam cushion of said vehicle seat and said at least one second electrode is located between said at least one first electrode and said at least one third electrode.

13. A system for detecting an occupant in a vehicle with a safety restraint system as recited in claim 12, wherein said at least one third electrode is electrically connected to a circuit ground.

14. A system for detecting an occupant in a vehicle with a safety restraint system as recited in claim 12, wherein said first sensing circuit is operatively coupled to at least one said second electrode.

15. A system for detecting an occupant in a vehicle with a safety restraint system as recited in claim 14, wherein said first sensing circuit applies a first applied signal to said at least one first electrode and applies a second applied signal to said at least one second electrode.

16. A system for detecting an occupant in a vehicle with a safety restraint system as recited in claim 15, wherein said second applied signal is equal so said first applied signal.

17. A system for detecting an occupant in a vehicle with a safety restraint system as recited in claim 12, wherein said first sensing circuit is operatively coupled to at least one said third electrode and said first sensing circuit applies a third applied signal to said third electrode.

18. A system for detecting an occupant in a vehicle with a safety restraint system as recited in claim 17, wherein said third applied signal is a circuit ground potential.

19. A system for detecting an occupant in a vehicle with a safety restraint system as recited in claim 1, wherein said first signal is responsive to the capacitance between said at least one first electrode and a circuit ground.

20. A system for detecting an occupant in a vehicle with a safety restraint system as recited in claim 1, wherein said first sensing circuit applies a first applied signal to said at least one first electrode.

21. A system for detecting an occupant in a vehicle with a safety restraint system as recited in claim 20, wherein said first applied signal comprises a first oscillating signal.

22. A system for detecting an occupant in a vehicle with a safety restraint system as recited in claim 1, wherein said first sensing circuit adapts a decision threshold responsive to said comparison.

23. A system for detecting an occupant in a vehicle with a safety restraint system as recited in claim 1, wherein said weight sensor comprises a sensor selected from the group consisting of a hydrostatic weight sensor mountable within said vehicle seat, at least one strain gage within an element supporting said vehicle seat; and a pressure sensitive resistive element mountable within said vehicle seat.

24. A system for detecting an occupant in a vehicle with a safety restraint system as recited in claim 1, wherein said controller adapts an actuation characteristic of said safety restraint system responsive to a measurement selected from the group consisting of a weight measurement from said weight sensor and a measurement from said first electric field sensor.

25. A system for detecting an occupant in a vehicle with a safety restraint system as recited in claim 24, wherein said safety restraint system is disabled if said first electric field sensor senses a condition selected from the group consisting of an empty said vehicle seat, an infant seat on said vehicle seat, a child seat on said vehicle seat, a booster seat on said vehicle seat, an occupant not seated directly on a seat bottom of said vehicle seat.

26. A system for detecting an occupant in a vehicle with a safety restraint system as recited in claim 24, wherein said safety restraint system is enabled if said first electric field sensor senses an occupant seated directly on said vehicle seat and said weight measurement is greater than a threshold.

27. A system for detecting an occupant in a vehicle with a safety restraint system as recited in claim 1, wherein the capacitance of said reference capacitor is stable over a range of temperatures.

28. A system for detecting an occupant in a vehicle with a safety restraint system, comprising:
   a. a first electric field sensor comprising at least one first electrode mountable in a seat bottom of a vehicle seat, wherein said first electric field sensor is responsive to at least one electric-field-influencing property of an object on said vehicle seat, said first electric field sensor further comprises at least one second electrode and at least one third electrode, wherein said at least one third electrode is located between said at least one first electrode and a foam cushion of said vehicle seat, said at least one second electrode is located between said at least one first electrode and said at least one third electrode, and said at least one second electrode is substantially the same size as said at least one first electrode;
   b. a first sensing circuit operatively coupled to at least one said first electrode of said first electric field sensor wherein said first sensing circuit generates a first signal responsive to said at least one electric-field-influencing property of an object proximate to said first electric field sensor;
   c. a weight sensor operatively coupleable to said vehicle seat for measuring the weight of an object upon said vehicle seat; and
   d. a controller operatively coupled to said first electric field sensor and to said weight sensor, wherein said controller discriminates a type of object on said vehicle seat responsive to said first signal and to said weight sensor, and said controller controls the actuation of the safety restraint system responsive to said type of object.

29. A system for detecting an occupant in a vehicle with a safety restraint system, comprising:
   a. a first electric field sensor comprising at least one first electrode mountable in a seat bottom of a vehicle seat, wherein said first electric field sensor is responsive to at least one electric-field-influencing property of an object on said vehicle seat;
   b. a first sensing circuit operatively coupled to at least one said first electrode of said first electric field sensor wherein said first sensing circuit generates a first signal responsive to said at least one electric-field-influencing property of an object proximate to said first electric field sensor;
   c. a weight sensor operatively coupleable to said vehicle seat for measuring the weight of an object upon said vehicle seat, wherein said first electric field sensor is incorporated in said weight sensor; and
   d. a controller operatively coupled to said first electric field sensor and to said weight sensor, wherein said controller discriminates a type of object on said vehicle seat responsive to said first signal and to said weight sensor, and said controller controls the actuation of the safety restraint system responsive to said type of object.

30. A system for detecting an occupant in a vehicle with a safety restraint system as recited in claim 29, wherein at least one conductor of said weight sensor comprises said at least one first electrode.

31. A system for detecting an occupant in a vehicle with a safety restraint system as recited in claim 29, wherein said at least one first electrode is operatively coupled to a conductor of said weight sensor.

32. A system for detecting an occupant in a vehicle with a safety restraint system as recited in claim 29, wherein said first sensing circuit measures the capacitance of a first conductor of said weight sensor so as to sense at least one electric-field-influencing property of an object on said vehicle seat.

33. A system for detecting an occupant in a vehicle with a safety restraint system as recited in claim 32, wherein said capacitance is measured with respect to a circuit ground.

34. A system for detecting an occupant in a vehicle with a safety restraint system as recited in claim 32, wherein said capacitance is measured with respect to a second conductor of said weight sensor.

35. A system for detecting an occupant in a vehicle with a safety restraint system, comprising:
   a. a first electric field sensor comprising at least one first electrode mountable in a seat bottom of a vehicle seat, wherein said first electric field sensor is responsive to at least one electric-field-influencing property of an object on said vehicle seat;
   b. a first sensing circuit operatively coupled to at least one said first electrode of said first electric field sensor wherein said first sensing circuit generates a first signal responsive to said at least one electric-field-influencing property of an object proximate to said first electric field sensor;
   c. a weight sensor operatively coupleable to said vehicle seat for measuring the weight of an object upon said vehicle seat, wherein said weight sensor measures a weight-responsive property between two conductors of said weight sensor so as to measure the weight of an object on said vehicle seat; and
   d. a controller operatively coupled to said first electric field sensor and to said weight sensor, wherein said controller discriminates a type of object on said vehicle seat responsive to said first signal and to said weight sensor, and said controller controls the actuation of the safety restraint system responsive to said type of object.

36. A system for detecting an occupant in a vehicle with a safety restraint system as recited in claim 35, wherein said weight-responsive property comprises a force-responsive resistance.

37. A system for detecting an occupant in a vehicle with a safety restraint system, comprising:
  a. a first electric field sensor comprising at least one first electrode mountable in a seat bottom of a vehicle seat, wherein said first electric field sensor is responsive to at least one electric-field-influencing property of an object on said vehicle seat;
  b. a first sensing circuit operatively coupled to at least one said first electrode of said first electric field sensor wherein said first sensing circuit generates a first signal responsive to said at least one electric-field-influencing property of an object proximate to said first electric field sensor;
  c. a weight sensor operatively coupleable to said vehicle seat for measuring the weight of an object upon said vehicle seat; and
  d. a controller operatively coupled to said first electric field sensor and to said weight sensor, wherein said controller discriminates a type of object on said vehicle seat responsive to said first signal and to said weight sensor, and said controller controls the actuation of the safety restraint system responsive to said type of object, and wherein said controller relies upon said weight sensor when said first sensing circuit detects a wetness condition of said vehicle seat.

38. A system for detecting an occupant in a vehicle with a safety restraint system, comprising:
  a. a first electric field sensor comprising at least one first electrode mountable in a seat bottom of a vehicle seat, wherein said first electric field sensor is responsive to at least one electric-field-influencing property of an object on said vehicle seat;
  b. a first sensing circuit operatively coupled to at least one said first electrode of said first electric field sensor wherein said first sensing circuit generates a first signal responsive to said at least one electric-field-influencing property of an object proximate to said first electric field sensor;
  c. a weight sensor operatively coupleable to said vehicle seat for measuring the weight of an object upon said vehicle seat; and
  d. a controller operatively coupled to said first electric field sensor and to said weight sensor, wherein said controller discriminates a type of object on said vehicle seat responsive to said first signal and to said weight sensor, and said controller controls the actuation of the safety restraint system responsive to said type of object, and wherein a failure of a sensor selected from the group consisting of said weight sensor and said field electric field sensor is detected responsive to said first electric field sensor detecting an occupant seated on said vehicle seat and said weight sensor measuring a weight less than a threshold.

\* \* \* \* \*

UNITED STATES PATENT AND TRADEMARK OFFICE
CERTIFICATE OF CORRECTION

PATENT NO.   : 6,577,023 B1
DATED        : June 10, 2003
INVENTOR(S)  : James G. Stanley et al.

It is certified that error appears in the above-identified patent and that said Letters Patent is hereby corrected as shown below:

Title page,
Item [60], Related U.S. Application Data, "Jul. 13, 1999" should be changed to
-- Jul. 12, 1999 --; and
Item [56], References Cited, U.S. PATENT DOCUMENTS, the following should be added:
-- 5,626,359 A   5/1997 Steffens, Jr. et al.    280/735
   5,732,375 A * 3/1998 Cashler              701/45
   6,012,007 A * 1/2000 Fortune et al.       701/45 --.

Column 1,
Lines 20, 27, 34 and 40, "entitled Occupant Detection System" should be deleted before ", filed on".

Column 7,
Line 41, "effect" should be changed to -- affect --.

Column 8,
Line 5, "incorporated" should be changed to -- incorporates --; and
Line 57, "don's" should be changed to -- don't --.

Column 10,
Line 37, "$C_{mem}$" should be changed to -- $C_{meas}$ --.

Column 11,
Line 42, "effects" should be changed to -- affects --; and
Line 61, "restraint system 30" should be changed to -- restraint system 38 --.

Column 12,
Line 30, "input 12" should be changed to -- input 812 --; and
Line 62, -- Q3a, -- should be inserted before "and Q3b".

UNITED STATES PATENT AND TRADEMARK OFFICE
CERTIFICATE OF CORRECTION

PATENT NO.   : 6,577,023 B1
DATED        : June 10, 2003
INVENTOR(S)  : James G. Stanley et al.

It is certified that error appears in the above-identified patent and that said Letters Patent is hereby corrected as shown below:

Column 16,
Line 26, a comma -- , -- should be added after "seat"; and
Line 44, "so" should be changed to -- to --.

Signed and Sealed this

Twenty-first Day of December, 2004

JON W. DUDAS
*Director of the United States Patent and Trademark Office*